(12) United States Patent
Wilensky

(10) Patent No.: US 6,456,297 B1
(45) Date of Patent: Sep. 24, 2002

(54) MULTIPOLE BRUSHING

(75) Inventor: Gregg D. Wilensky, San Jose, CA (US)

(73) Assignee: Adobe Systems Incorporated, San Jose, CA (US)

(*) Notice: Subject to any disclaimer, the term of this patent is extended or adjusted under 35 U.S.C. 154(b) by 0 days.

(21) Appl. No.: 09/568,623

(22) Filed: May 10, 2000

(51) Int. Cl.⁷ .............................. G09G 5/00; G06K 9/00
(52) U.S. Cl. ................ 345/619; 345/589; 345/382; 345/162
(58) Field of Search ........................ 345/619, 589, 345/581, 600, 639; 382/162

(56) References Cited

U.S. PATENT DOCUMENTS

| | | | | |
|---|---|---|---|---|
| 4,954,970 A | * | 9/1990 | Walker et al. | 345/639 |
| 5,105,469 A | * | 4/1992 | MacDonald et al. | 382/162 |
| 5,506,946 A | * | 4/1996 | Bar et al. | 345/600 |
| 5,598,182 A | * | 1/1997 | Berend et al. | 345/619 |
| 5,828,379 A | * | 10/1998 | Cok | 345/581 |
| 5,999,190 A | * | 12/1999 | Sheasby et al. | 345/589 |

* cited by examiner

Primary Examiner—Jeffery Brier
Assistant Examiner—Anthony Blackman
(74) Attorney, Agent, or Firm—Fish & Richardson P.C.

(57) ABSTRACT

An apparatus, method, and computer program product for manipulating an edge in an image. The method includes selecting a portion of the image in response to user manipulation of a brush having two or more regions, the portion including an edge; orienting the brush so that a first region lies on a first side of the edge and a second region lies on a second side of the edge; performing a first effect in the portion of the image covered by the first region; and performing a second effect in the portion of the image covered by the second region. The edge can be an edge of a mask. The image can include a mask channel defining the mask, and the method can include performing the first and second effects on the mask channel. The first side of the extraction mask edge is of greater opacity than the second side of the extraction mask edge, and the method includes increasing the opacity of the mask in the first region and decreasing the opacity of the mask in the second region.

28 Claims, 6 Drawing Sheets

MULTIPOLE BRUSHING

BACKGROUND

The present invention relates to computer-implemented methods for modifying an electronic image.

Computer painting programs allow the user to manipulate an electronic image with an onscreen "brush" controlled by an input device such as a mouse. The user may typically select from among a variety of brush shapes, e.g., circle, square, or single pixel. The user drags the brush along a "trajectory" from one location to another within the image, thereby defining an "envelope." Pixels within the envelope are affected by the operation of the brush. One type of brush allows a user to "paint" colors and textures into the envelope. The paint brush replaces the pixels in the envelope with the image of the brush.

Often it is desirable to extract an object from its background in an electronic image, referred to herein as a "source image." The object can then be placed in another image, referred to herein as a "destination image." One computer application that can accomplish this extraction is Adobe Photoshop™, which includes an object extraction tool. Object extraction tools create a mask that indicates the degree to which each pixel in the image is associated with the background or the foreground object. For an eight-bit mask, a mask value of zero for a pixel indicates that the pixel belongs only to the background; a mask value of 255 indicates that the pixel belongs only to the foreground object. Pixels having mask values between zero and 255 belong partly to both the foreground object and the background. Pixels belonging to both the foreground object and the background can occur where the edges of the object blend into the background, for example.

In addition to the mask, object extraction tools may produce altered color values for pixels belonging to both the foreground object and the background. These new colors, obtained by removing background color contamination, represent the foreground object's intrinsic color values.

Object extraction tools work well with objects having simple edges, but encounter difficulty when faced with objects having complex edges. These difficulties result in the unwanted appearance of opaque (high mask value) pixels in regions which should be transparent (low mask values) as well as transparent pixels in regions which should be opaque. These artifacts can be fixed by touching up the resultant image with various paint brushes and erasers applied either to the image, the mask or both. However, standard brushes do not respect mask edges and consequently can require a large amount of manual effort to clean up an imperfect mask edge. Nor do they provide a simple means of shaping and sharpening edges.

SUMMARY OF THE INVENTION

In general, in one aspect, the invention features a method and computer program product for painting in an image having one or more channels. It includes selecting a portion of the image in response to user manipulation of a brush having two or more regions; increasing the value of one or more of the channels covered by one of the regions; and decreasing the value of one or more of the channels covered by another one of the regions.

In general, in one aspect, the invention features a method and computer program product for manipulating an edge in an image. It includes selecting a portion of the image in response to user manipulation of a brush having two or more regions, the portion including an edge; orienting the brush so that a first region lies on a first side of the edge and a second region lies on a second side of the edge; performing a first effect in the portion of the image covered by the first region; and performing a second effect in the portion of the image covered by the second region. The edge can be an edge of a mask.

Particular implementations can include one or more of the following features. The image includes a mask channel defining the mask, and the method includes performing the first and second effects on the mask channel. The first side of the extraction mask edge is of greater opacity than the second side of the extraction mask edge, and the method includes increasing the opacity of the mask in the first region; and decreasing the opacity of the mask in the second region. The image includes one or more color channels, and the method includes modifying the color values in one or more of the color channels. The image includes an object extracted from a source image, and the method includes replacing the values in the color channels covered by the first region of the image with a combination of values from the color channels in the image and source image.

Particular implementations can also include detecting the mask edge. Detecting can include calculating an angle between a reference line and a perpendicular to a potential edge; calculating an offset (the shortest distance) between a reference point and the potential edge; and calculating a measure of confidence that the potential edge is an edge of the image mask. Calculating an angle can include obtaining the average first-order moment of the mask. Calculating an angle can include obtaining the average value of the mask within the portion. Calculating an offset includes calculating the shortest distance between a reference point and the potential edge, and can also include obtaining the average value of the mask within the portion. Calculating a measure of confidence includes obtaining the average value of the mask within the portion.

In general, in one aspect, the invention features a method and computer program product for moving a mask edge of a mask in an image, the mask edge separating a region of greater opacity from a region of lesser opacity. It includes selecting a portion of the image in response to user manipulation of a brush having two or more regions, the portion including the mask edge; orienting the brush so that a first brush region lies in the region of greater opacity and a second brush region lies in the region of lesser opacity; increasing the opacity of the mask in the first region; and decreasing the opacity of the mask in the second region.

Particular implementations can include centering the brush in the vicinity of the mask edge; and repeating the increasing and decreasing steps, thereby moving the mask edge. The method can also include centering the brush on the mask edge; and repeating the increasing and decreasing steps, thereby smoothing the mask edge.

Advantages that can be seen in implementations of the invention include one or more of the following. Complex edges of extracted objects can be sharpened quickly and easily. Complex edges can be smoothed to produce cleaner edges; the smoothing is controllable by the user. Bumps can be removed from edges, the size of the bump determined by the size of the brush used. Edges can be adjusted by moving the edge boundary in a local area.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
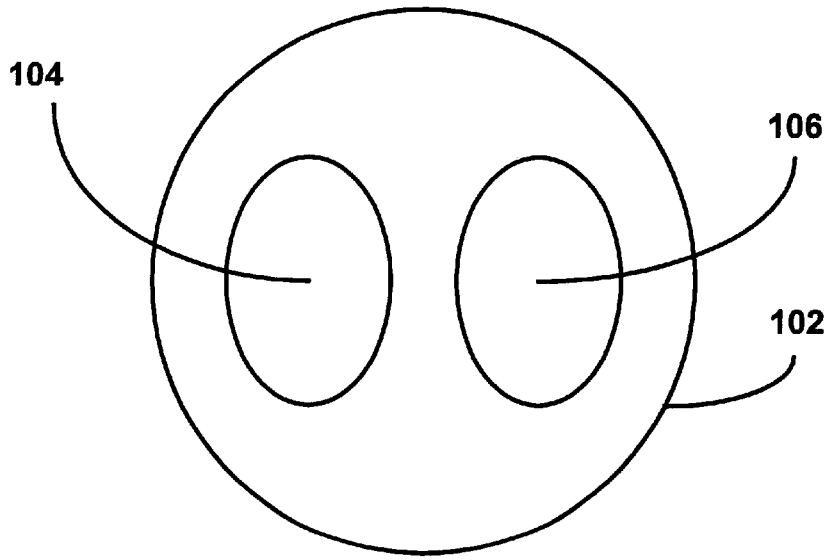
FIG. 1 shows a dipole brush that includes two regions, referred to as "poles."

As shown in FIG. 1, a dipole brush 102 includes two regions, referred to as "poles" 104 and 106. The poles are shown as ellipsoids, but can be of any shape. In addition, the poles may have a gradient that causes the effect of a pole to be stronger near its center, and weaker near its edges. For example, a Gaussian gradient can be used.

Pole 104 performs one effect, and pole 106 performs another effect. For example, the negative pole could perform a Gaussian blur and the positive pole could have no effect, or the positive pole could perform a sharpening operation. Such a brush could be used to blur edges of objects which are too crisp. Alternatively, the negative pole could perform a shift of color hue toward a desired color, say red, while the positive pole could perform a shift toward a different color, or toward the same color, but by a different amount of shift. Such a brush could be used to correct for color artifacts at object edges, or simply to produce interesting artistic effects. Other artistic effects can be obtained if the negative pole applies one style of painting and the positive pole applies a differing style. The differing styles may consist of differing paint blending modes, colors, hues, color saturation, and even the application of differently shaped brushes. For example, the 'Art History Brush' in Photoshop 5.5 and 6.0 applies multiple brush paint strokes starting from a given pixel location. The strokes can be varied by a range of stylistic parameters. Such strokes can be applied with one set of parameters by the negative pole and another set of parameters by the positive pole. Of course, brush 102 can have more than two poles.

The dipole brush has one positive polar region and one negative polar region. Between the two regions is a gradation of values between positive and negative. This results in values which are zero along a line which passes through the brush center and separates the two poles. In general, there will result such a line, though not necessarily a straight line, between any two poles of opposite polarity. For the dipole brush, this line of no change is essential for cleaning up slightly fuzzy edges. The fuzz, or small imperfection in the edge, is unchanged at the line, and changed only slightly near the line. Because of this, fuzzy edges can be maintained; alternatively, repeated brushing will straighten out the fuzz as well.

Other implementations feature brushes more complex than the dipole brush. In principle, the brush may have an arbitrary number of poles of both positive and negative type. The shape of the region bounding each pole is arbitrary, and the strength of the brush, as determined by a function, multipoleFunction(x, y), of brush coordinates, x and y, is arbitrary in each region. As an example, a brush with three negative poles located in three of four quadrants of a rectangle (upper left, upper right, lower left) and one positive pole in the remaining quadrant (lower right) provides a mechanism to clean up a mask corner.

A pole can perform more that one effect. For example, a pole can perform one effect on a mask channel and another effect on a color channel. A brush having such a pole can be used to clean up the edge of an object while brightening the color of the object, for example.

Figure 2:
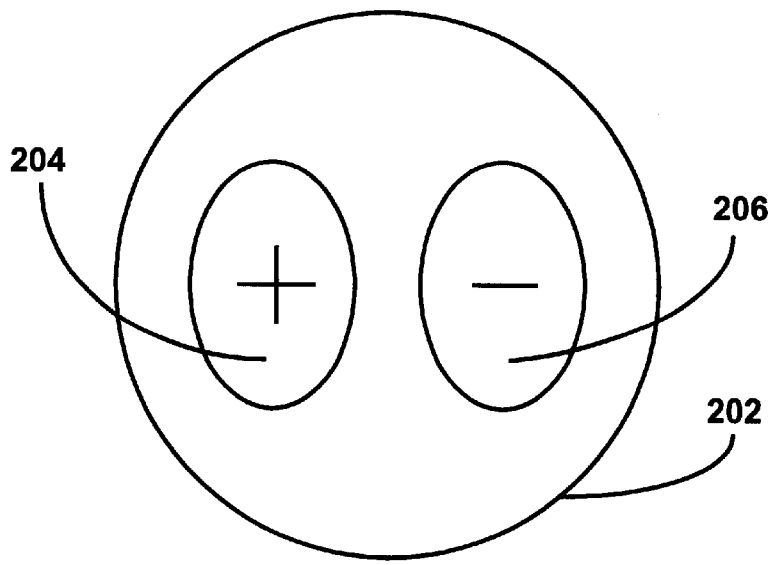
FIG. 2 shows a dipole brush that includes a positive pole and a negative pole.

As shown in FIG. 2, a dipole brush 202 includes a positive pole 204 and a negative pole 206. The positive pole adds paint to an image, and the negative pole removes paint from an image. An image can have one or more color channels. For example, an RGB image has three color channels: red, green, and blue. For each pixel in the image, each color channel has a color value. For example, for an eight-bit color channel, the color values can range between zero and 255. The dipole brush 202 adds paint to an image by increasing the color values in one or more of the color channels in the part of the image traversed by positive pole 204. The dipole brush 202 removes paint from an image by decreasing the color values in one or more of the color channels in the part of the image traversed by negative pole 206.

The dipole brush can be used to sharpen or move an edge in an image. An edge in an image is defined by a discontinuity in the values within one or more channels in the image. For example, for an image containing a red disk object, pixels within the disk object have high color values in the red color channel, and pixels outside the disk object have low color values in the red color channel. The discontinuity in the red color channel between pixels within the disk object and pixels outside the disk object defines the edge of the disk object.

A user can brush an edge of an object using the dipole brush, orienting the brush so that the positive pole lies within the object and the negative pole lies outside the object. If the edge is complex, the user can brush the edge so the edge lies midway between the poles of the brush. The brush then adds paint on one side of the edge, and removes paint on the other side, thereby sharpening the edge.

If the user wishes to move an edge, for example, to expand or contract an object, the user can brush the edge so the edge lies beneath one of the poles. If the edge is beneath the negative pole, the edge will move toward the object. If the edge is beneath the positive pole, the edge will move away from the object.

In addition to one or more color channels, many images include a mask channel that defines one or more objects. Pixels within an object have a high mask value in the mask channel. Pixels outside an object have a low mask value in the mask channel. Intermediate mask values in the mask channel indicate the degree to which the pixels are associated with an object.

Figure 3:
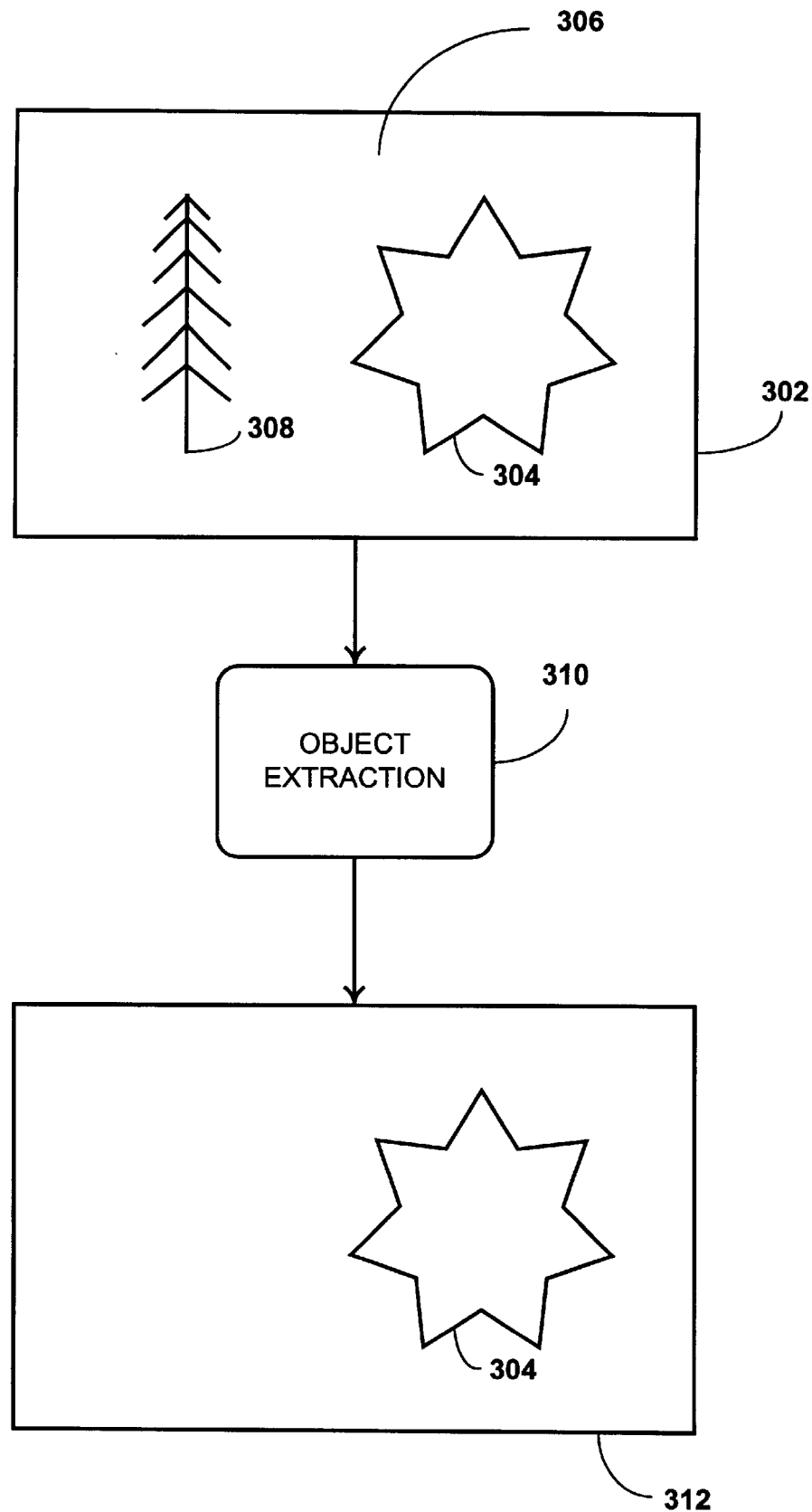
FIG. 3 shows an object extraction process.

Sharpening a mask edge is especially useful when applied to the destination mask and destination image which results from extracting an object from a source image. An object extraction process is depicted in FIG. 3. A source image 302 includes an object 304 and a background 306. The background may contain other objects, such as tree 308. Object 304 has a mask.

A user employs an object extraction process 310 to extract object 304. For example, the extraction process may be a simple "cut" operation provided by a graphics arts program such as Adobe Photoshop™. The extracted object is used to produce a destination image 312.

For example, the user can simply "paste" the extracted object into a new image.

Alternatively, the extraction process can be a more complex process, such as that carried out by the 'Image Extract'feature of Adobe Photoshop™. In this process, both a destination mask and a destination color image are created to produce extractions of potentially fuzzy objects such as those containing hair and fur.

The extracted object may have a complex edge, as defined by its mask. For example, the mask edge may be jagged or have voids. Such an edge may be produced by a fuzzy object, such as fur or hair. The dipole brush can be used to clean up the edge.

Figure 4:
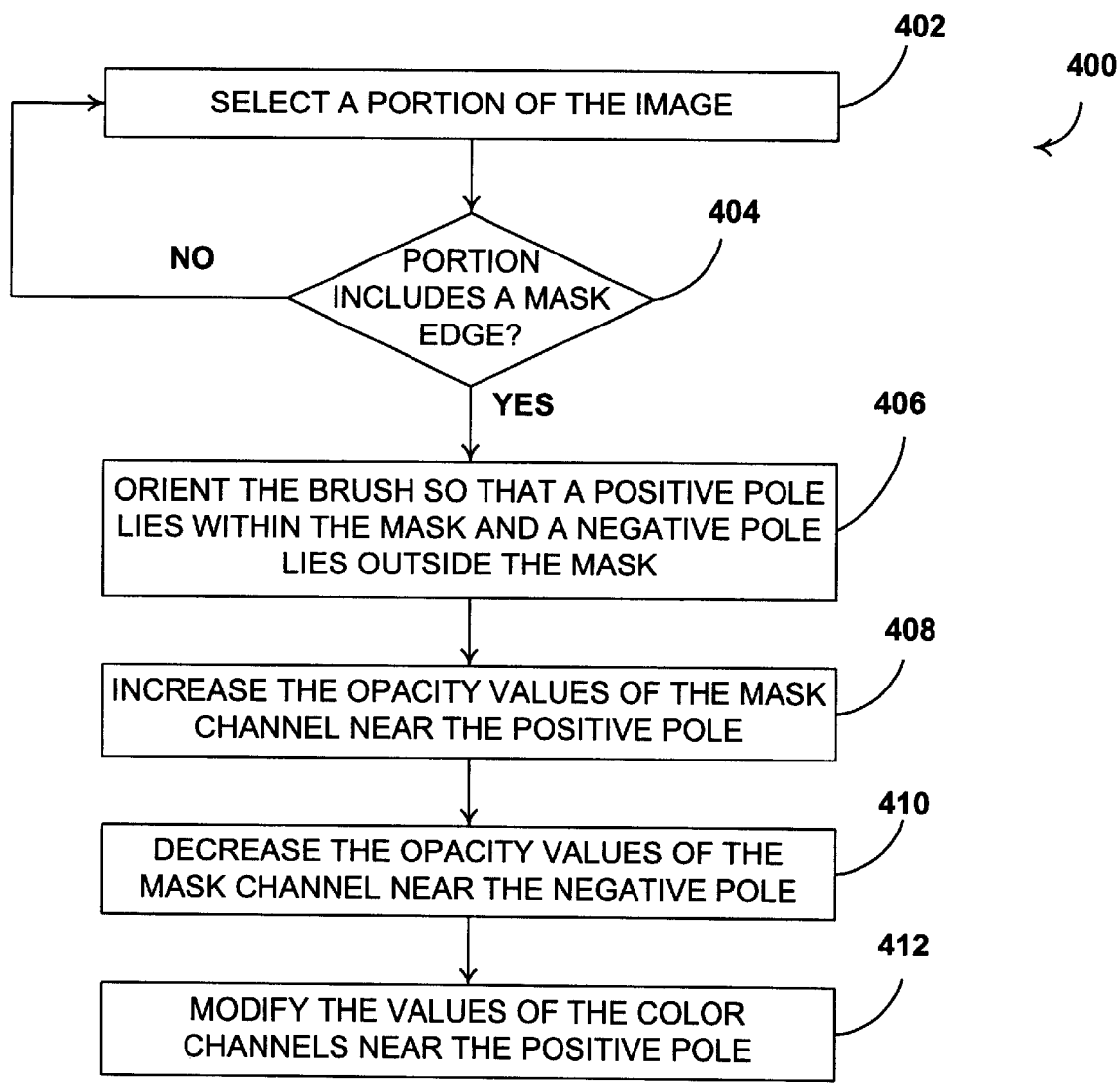
FIG. 4 is a flowchart of a process for painting in an image.

FIG. 4 is a flowchart of a process 400 for painting in an image. A user manipulates a dipole brush. In response, a portion of an image is selected (step 402). Process 400 determines whether the selected portion of the image (that is, the portion of the image within the brush cursor) includes a mask edge (step 404). If not, the process returns to step 402. A process for detecting an edge is described in detail below.

Figure 5:
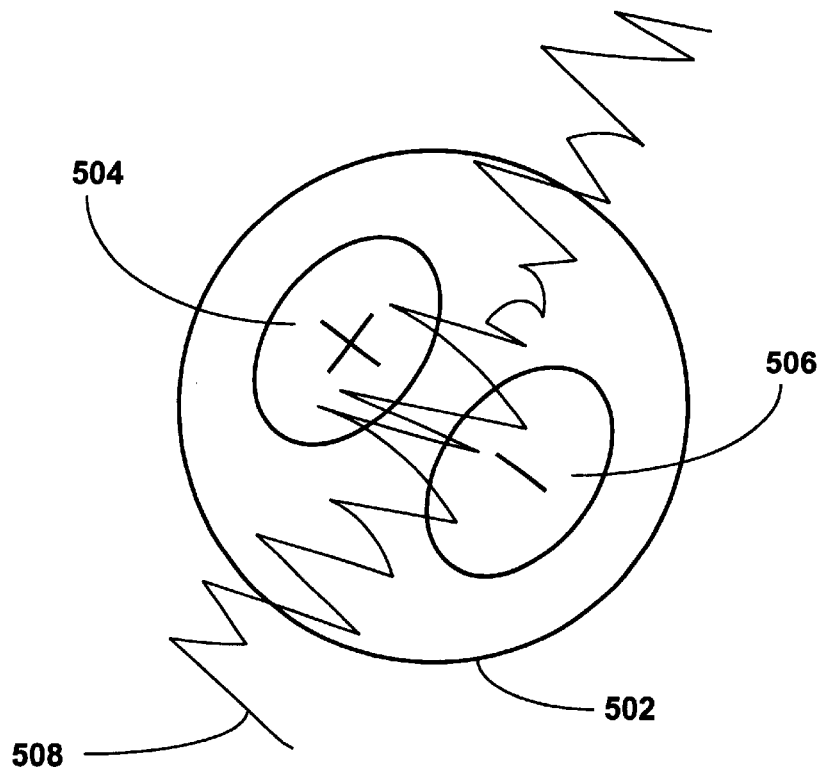
FIG. 5 depicts a dipole brush located over a mask edge in an image.

FIG. 5 depicts a dipole brush 502 located over a mask edge 508 in an image. Mask edge 508 is jagged, and extends within both positive pole 504 and negative pole 506 of brush 502. For the brush to be most effective in cleaning up an edge, it should be aligned with the edge. The process orients the brush so that positive pole 504 lies within the denser portion of the mask (the portion representing the object) and negative pole 506 lies outside the denser portion (inside the less dense portion, which represents the outside region of the object) (step 406). The process aligns the brush with the edge automatically. When the brush is properly aligned with the edge, the cursor changes to indicate the alignment. For example, the cursor can display a pair of cross-hairs aligned with the edge. Optionally, the process can center the brush over the mask edge.

Figure 6:
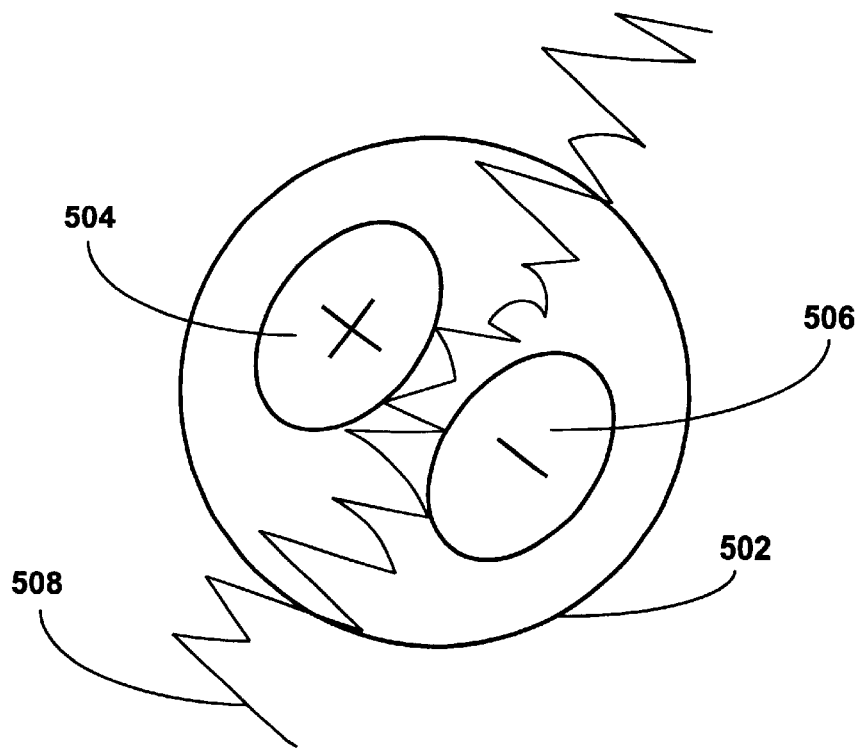
FIG. 6 shows the effect of reducing excursions of the mask edge within the poles of the brush.

The process increases the opacity values in the mask channel near the positive pole of the brush (step 408). The process also decreases the opacity values in the mask channel near the negative pole of the brush (step 410). For example, this operation has the effect of reducing excursions of the mask edge within the poles of the brush, as shown in FIG. 6.

As the mask grows, the process also fills the new area of the mask with color by modifying the color values in the color channels of the image near the positive pole of the brush (step 412). The color used to fill a pixel is a combination of the color of that pixel in the destination image and the color of the corresponding pixel in the source image. The proportions of source and destination color used are determined according to the opacity value in the mask channel for the pixel.

Let the color of a pixel be described as a vector C. For an RGB image, C=(r, g, b) where r, g, and b, are the color values in the red, green, and blue color channels for the pixel described by C. Then the new color $C_d'$ of a destination pixel is given by $$C_d' = hC_s + (1-h)C_d$$

where $C_d$ is the present color of the destination pixel, $C_s$ is the color of the corresponding source pixel, and h is determined according to $$h = a_d + \frac{1}{2}(1-a_d)^2$$

where $a_d$ is the opacity value in the mask channel for the pixel divided by the number of possible opacity values less one. For example, for an eight-bit mask channel, the number of possible opacity values less one is 256−1=255.

Figure 7:
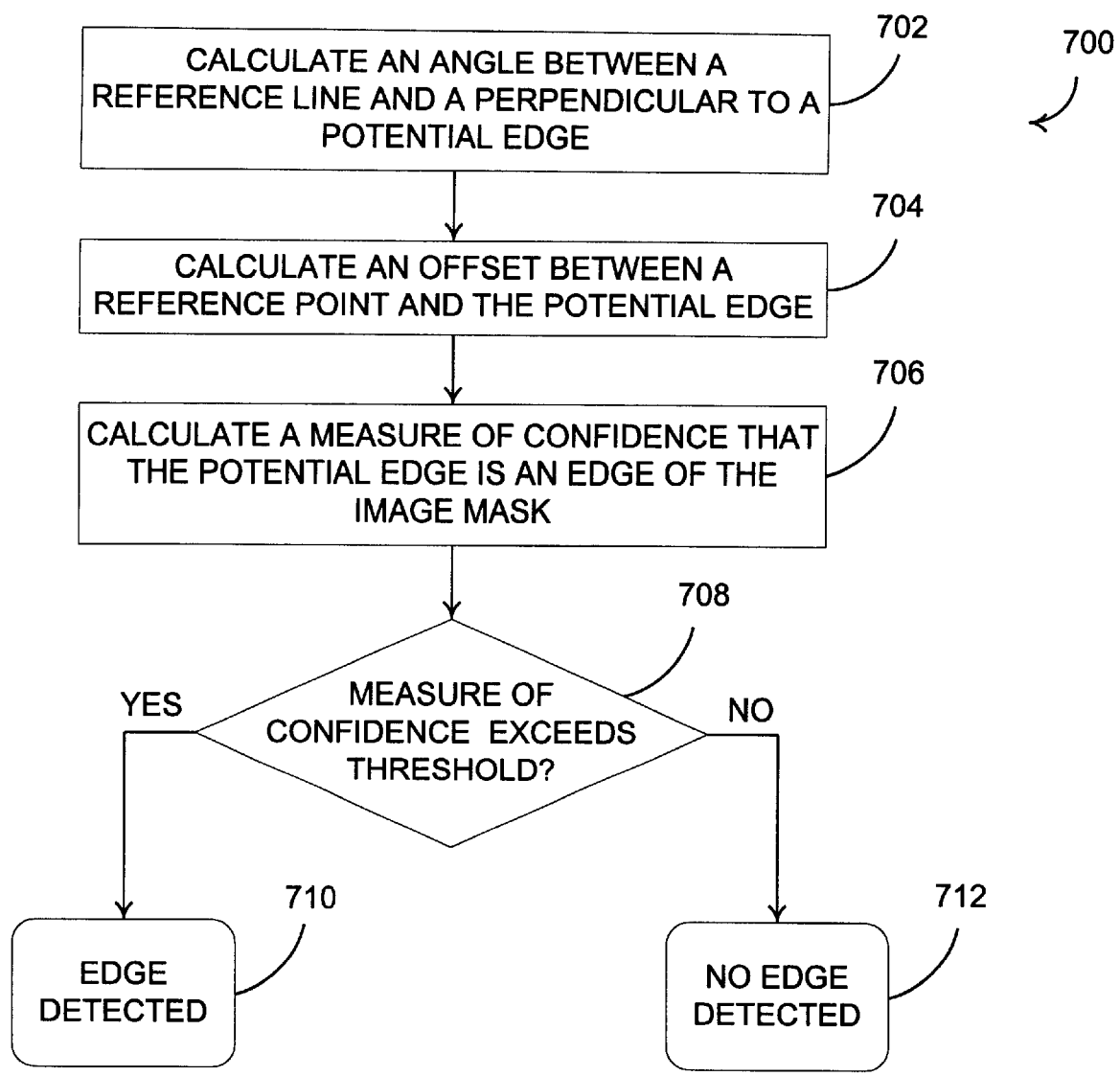
FIG. 7 is a flowchart for a process for detecting an edge.
Figure 8:
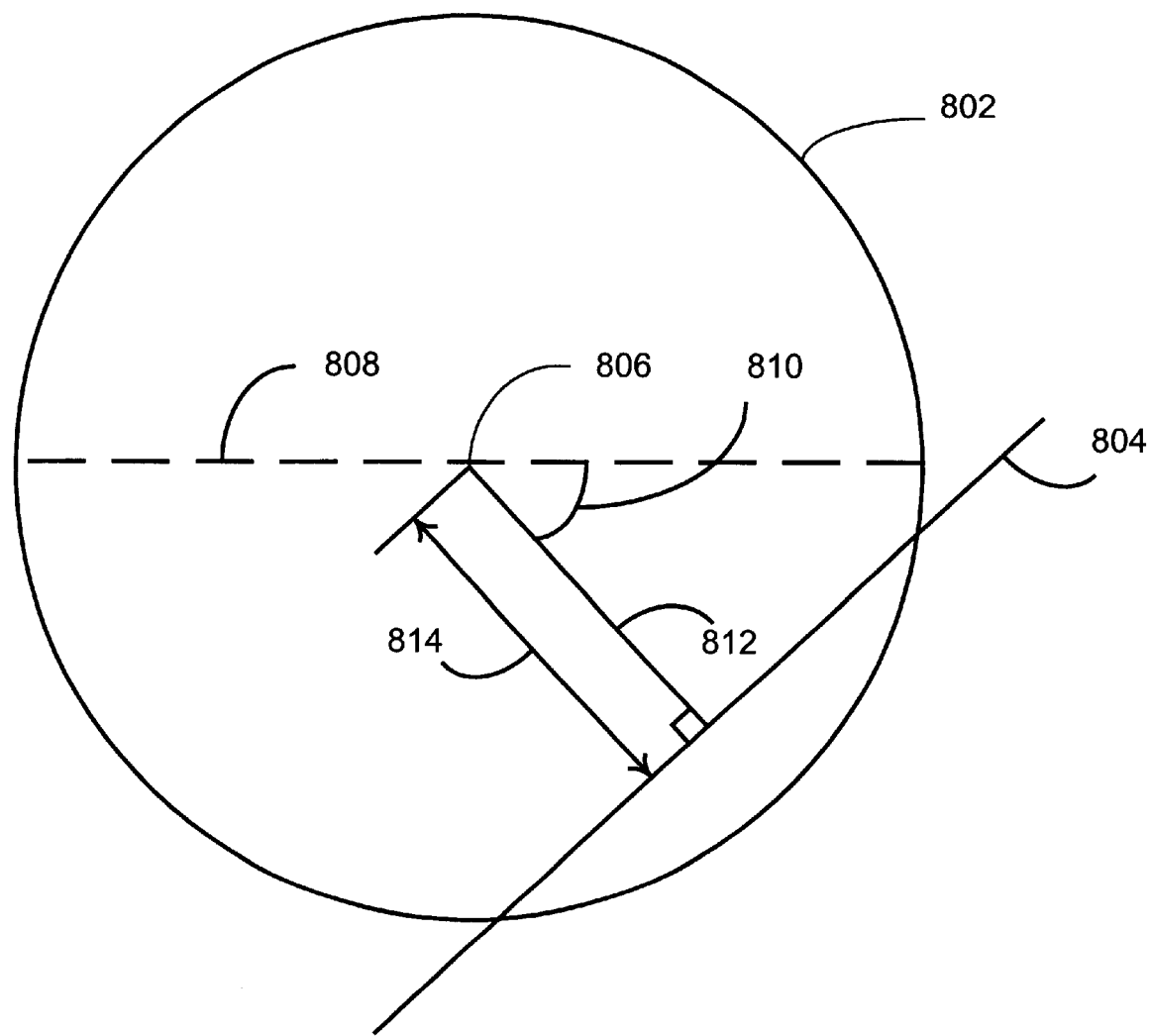
FIG. 8 depicts a brush cursor containing an image feature, referred to as a "potential edge," that may be an edge.

FIG. 7 is a flowchart for a process 700 for detecting an edge. FIG. 8 depicts a brush cursor 802 over an image feature, referred to as a "potential edge" 804, that may be an edge. First the process defines a reference point 806 and a reference line 808. The reference point can be the center of a round brush. The reference line can be a horizontal line passing through the center of a round brush.

The process calculates an angle 810 between the reference line and a perpendicular 812 to the potential edge (step 702). In one implementation, a least squares approach is used to minimize the average difference between the average mask value and a simple model fit of the mask value. The model fit image intensity is assumed to be a linear gradient given by $$\text{mask}(x,y) = m(xy) = m0 + \text{gradient} \times ((nx \times x) + (ny \times y))$$

where m0 is a constant, the average value of the mask intensity under the brush area; nx and ny are components of a two dimensional unit vector pointing perpendicular to the edge; and gradient is a constant that characterizes the sharpness of the transition over the brush area.

With this simplified model, the angle 810, theta, can be calculated as $$\text{theta} = pi/2 + a\tan(-ny/nx)$$

where $$nx = N \times [\langle mx \rangle - \langle m \rangle \langle x \rangle]$$

$$ny = N \times [\langle my \rangle - \langle m \rangle \langle y \rangle]$$

$$N = \frac{1}{\sqrt{(\langle mx \rangle - \langle m \rangle \langle x \rangle)^2 + (\langle my \rangle - \langle m \rangle \langle y \rangle)^2}}$$

The symbol< . . . >refers to an average over the brush area and m is the mask intensity value at location x,y, given by $$m = m(xy)$$

which takes on values from 0 to the number of opacity values less one. For example, for an eight bit mask, the number of opacity values less one is 256−1=255, and m can have values ranging from 0 to 255. mx is the product of the mask intensity value with the x coordinate, and is given by $$mx = m(x,y) \times x$$

my is the product of the mask intensity value with the y coordinate, and is given by $$my = m(x,y) \times y$$

The average values of mx and my, denoted <mx> and <my>, are referred to as the first moments of the mask intensity.

The process calculates the offset 814 between the reference point and the potential edge (step 704). The offset can be the shortest distance between the reference point and the potential edge. In one implementation, the offset is determined by obtaining the average first-order moment of the mask.

The offset of the edge from the brush center can be determined from the average mask density under the brush, <m>. An approximate expression is:

offset/brushRadius=$pi$/2 delta+(8−2$pi$) delta$^3$ where delta=<m>−½, and brushRadius is the radius of a circular brush.

The process calculates a measure of confidence that the potential edge is an edge of the image mask (step 706). The measure of confidence is obtained by calculating the average value of the mask within the portion of the image selected by the brush.

The process compares the measure of confidence to a predetermined threshold (step 708). If the measure of confidence exceeds the predetermined threshold, then the process has detected an edge (step 710). If not, then no edge has been detected (step 712).

In one implementation, the measure of confidence is determined by the percentage of the brush cursor that is occupied by the mask. This fraction f is given by $$f=<m>$$

If the mask occupies too little of the brush cursor, or too much of the brush cursor, then no edge has been detected (the confidence that an edge is present is defined to be zero in this case). Otherwise, the confidence can be taken to be 1.0 (100%). In this implementation, the mask fraction, f, is compared to two predetermined thresholds. For example, if the mask occupies less than 90%, but more than 10%, of the brush cursor, then an edge has been detected, and the potential edge is an actual edge. In this situation, the logical formula that produces the confidence values is summarized as:

if ($f$>0.10 and $f$<0.90)

then confidence=1.0 else confidence=0.0

If the process has detected an edge with high confidence, then its location and orientation are given by the offset and angle calculated by the process. Of course, other processes can be used to detect an edge. Having located a high confidence edge, the brush effect is applied to the mask and/or image.

If the edge confidence is found to be low, the brush does not modify the mask or image colors in one implementation, as described by the "No" option of FIG. 4 (step 404). In an alternative implementation, the brush in this situation does change the mask or image colors, acting as a standard unoriented brush. For example, the brush in this situation may act as a monopole brush, with a single pole centered around the brush center, and may increase mask values in high mask value regions and decrease mask values in low mask value regions.

Let the brush profile be designated by a function, B(x,y). This function will have positive values in regions which correspond to positive brush poles and negative values in regions which correspond to negative brush poles. The brush has no effect if its value B(x,y)=0. In particular, a circular brush will have values B(x,y)=0 whenever the coordinates (x,y) lie outside of the brush radius.

$$B(xy)=0 \text{ if } (x-x\text{Center})^2+(y-y\text{Center})^2>\text{brushRadius}^2$$

where (xCenter, yCenter) are the coordinates of the center of the circular brush.

If the desired effect of the multi-pole brush is to change the mask intensity, then each brush application modifies the mask value, m(x, y) by an amount proportional to the brush function, B(x,y). First the brush is oriented to the edge and centered either at the edge or at the brush center. Orientation includes rotating the brush profile function B(x,y) by the calculated angle theta. Centering includes translating this function by the calculated offset value if the option of centering at the edge is desired. Then the mask value is replaced by a new value according to:

new value of $m(x, y)$=old value of $m(x,y)+B(x, y)\times$pressure, if (new value of $m(xy)$>255) new value of $m(x,y)$=255(for an 8-bit mask), if (new value of $m(x,y)$<0) new value of $m(x,y)$=0, where "pressure" is a constant which determines the strength of the brushing effect. Typical values for "pressure" range between 0 and 20.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

The invention has been described in terms of particular embodiments. Other embodiments are within the scope of the following claims. For example, the steps of the invention can be performed in a different order and still achieve desirable results.

As another example, the brush shape can be varied by changing the number and placement of the poles. One shape B(x, y) for a dipole brush is given by:

$$B(x,y) = \text{shapeFactor}(r) \times \text{multipoleFunction}(x,y)$$

where $$r = \sqrt{(x - xCenter)^2 - (y - yCenter)^2}$$

where (xCenter, yCenter) is the coordinate of the center of the brush. For a circular shaped dipole brush, example forms for the functions are given by:

shapeFactor(r)=1 if (r<brushRadius) and 0 otherwise, and $$\text{multipoleFunction}(x,y) = x1 \times abs(x1) \times \text{Gaussian}(r)$$

where $$Gaussian(r) = e^{-\frac{r^2}{(0.6 brushRadius)^2}}$$

If theta is the angle of the edge normal (a value of 0 radians will indicate a vertical edge which transitions from opaque to transparent as one goes from left to right; the edge normal points to the right; and angles increase counterclockwise), then x1=x cos(theta)−y sin(theta), where x and y are coordinates along the image x and y axes respectively. Just as an electric charge distribution can be expanded in terms of various order poles (monopole, dipole, quadrupole, etc.) various higher order brushes can be designed by mimicking these charge distributions. Another analytic formula for the brush shape can be obtained from the standard quantum mechanical solutions for the electron distribution in an atom, when projected into two dimensions. The full 3-dimensional form of the distribution can be used for 3D brushes which can be used to modify a 3D image. Of course, other variations are possible.

In the above-described implementation, a circular brush shape is used. The circular shape is one in which the effect of applying the brush vanishes outside of a circle (of radius equal to brushRadius) centered at the center of the brush. The brush shape is determined by the vanishing of the brush function, B(x, y), outside of the circle, as set by the brush shapeFactor. This is a convenient shape for many applications. However, there is nothing unique about a circular shape. Other brush shapes can be used. For example, the brush shape could be square, rectangular, or elliptical. Nor need the brush be symmetrical in shape. Indeed, the brush could have an arbitrary shape for its boundary. When applying artistic effects to an edge of an object in an image, a complex shape may produce a more desirable artistic effect.

In addition to the shapeFactor, which constrains the brush to vanish outside of some specified shape, the brush function, B(x, y), is determined also by multipoleFunction (x, y). This determines the strength and polarity of the regions within the brush. Regions with positive polarity have multipoleFunction(x, y) greater than zero, and result in adding to mask (or other channel) values, while regions with negative polarity have multipoleFunction(x, y) less than zero, and result in subtracting from mask (or other channel) values.

What is claimed is:

1. A computer program product, tangibly stored on a computer-readable medium, for painting in an image having one or more channels, comprising instructions operable to cause a programmable processor to:

select a portion of the image in response to user manipulation of a brush having a brush area including two or more regions, wherein each region spans a distinct part of the brush area, the regions including a first region and a second region, the first and second regions being separable by a line passing through a center of the brush area;

increase the value of one or more of the channels covered by the first region; and decrease the value of one or more of the channels covered by the second region.

2. A computer program product tangibly stored on a computer-readable medium, comprising instructions operable to cause a programmable processor to:

select a portion of an image in response to user manipulation of a brush having a brush area including two or more regions, wherein each region spans a distinct part of the brush area, the portion including an edge;

respond to the user selection of a portion of the image that includes an edge by automatically orienting the brush so that a first region lies on a first side of the edge and a second region lies on a second side of the edge;

perform a first effect in the portion of the image covered by the first region; and perform a second effect in the portion of the image covered by the second region.

3. The computer program product of claim 2, wherein the edge is an edge of a mask.

4. The computer program product of claim 3, wherein the image includes a mask channel defining the mask, further comprising instructions operable to cause a programmable processor to:

perform the first and second effects on the mask channel.

5. The computer program product of claim 4, wherein the first side of the mask edge is of greater opacity than the second side of the mask edge, further comprising instructions operable to cause a programmable processor to:

increase the opacity of the mask in the first region; and decrease the opacity of the mask in the second region.

6. The computer program product of claim 5, wherein the image includes one or more color channels, further comprising instructions operable to cause a programmable processor to:

modify the color values in one or more of the color channels.

7. The computer program product of claim 6, wherein the image includes an object extracted from a source image, further comprising instructions operable to cause a programmable processor to:

replace the values in the color channels of the image that are covered by the first region of the brush with a combination of values from the color channels in the image and source image.

8. The computer program product of claim 3, further comprising instructions operable to cause a programmable processor to:

detect the mask edge.

9. The computer program product of claim 8, wherein the instructions operable to cause a programmable processor to detect the mask edge comprise instructions operable to cause a programmable processor to:

calculate an angle between a reference line and a perpendicular to a potential edge;

calculate an offset between a reference point and the potential edge; and calculate a measure of confidence that the potential edge is an edge of the image mask.

10. The computer program product of claim 9, wherein the instructions operable to cause a programmable processor to calculate an angle comprise instructions operable to cause a programmable processor to:

obtain the average first-order moment of the mask.

11. The computer program product of claim 9, wherein the instructions operable to cause a programmable processor to calculate an angle further comprise instructions operable to cause a programmable processor to:

obtain the average value of the mask within the portion.

12. The computer program product of claim 9, wherein the instructions operable to cause a programmable processor to calculate an offset comprise instructions operable to cause a programmable processor to:

calculate the shortest distance between a reference point and the potential edge.

13. The computer program product of claim 12, wherein the instructions operable to cause a programmable processor to calculate an offset further comprise instructions operable to cause a programmable processor to:

obtain the average value of the mask within the portion.

14. The computer program product of claim 9, wherein the instructions operable to cause a programmable processor to calculate a measure of confidence comprise instructions operable to cause a programmable processor to:

obtain the average value of the mask within the portion.

15. A method for painting in an image having one or more channels comprising:

selecting a portion of the image in response to user manipulation of a brush having a brush area including two or more regions, wherein each region spans a distinct part of the brush area, the regions including a first region and a second region, the first and second regions being separable by a line passing through a center of the brush area;

increasing the value of one or more of the channels covered by the first region; and decreasing the value of one or more of the channels covered by the second region.

16. A method, comprising:

selecting a portion of an image in response to user manipulation of a bush having a brush area including two or more regions, wherein each region spans a distinct part of the brush area, the portion including an edge;

responding to the user selection of a portion of the image that includes an edge by automatically orienting the bush so that a first region lies on a first side of the edge and a second region lies on a second side of the edge;

performing a first effect in the portion of the image covered by the first region; and performing a second effect in the portion of the image covered by the second region.

17. The method of claim 16, wherein the edge is an edge of a mask.

18. The method of claim 17, wherein the image includes a mask channel defining the mask, further comprising:

performing the first and second effects on the mask channel.

19. The method of claim 18, wherein the first side of the mask edge is of greater opacity than the second side of the mask edge, further comprising:

increasing the opacity of the mask in the first region; and decreasing the opacity of the mask in the second region.

20. The method of claim 19, wherein the image includes one or more color channels, further comprising:

modifying the color values in one or more of the color channels.

21. The method of claim 20, wherein the image includes an object extracted from a source image, further comprising:

replacing the values in the color channels of the image that are covered by the first region of the brush with a combination of values from the color channels covered by the image and source image.

22. The method of claim 17, further comprising detecting the mask edge.

23. The method of claim 22, wherein the detecting step comprises:

calculating an angle between a reference line and a perpendicular to a potential edge;

calculating an offset between a reference point and the potential edge; and calculating a measure of confidence that the potential edge is an edge of the image mask.

24. The method of claim 23, wherein the step of calculating an angle comprises:

obtaining the average first-order moment of the mask.

25. The method of claim 23, wherein the step of calculating an angle further comprises:

obtaining the average value of the mask within the portion.

26. The method of claim 23, wherein the step of calculating an offset comprises:

calculating the shortest distance between a reference point and the potential edge.

27. The method of claim 26, wherein the step of calculating an offset further comprises:

obtaining the average value of the mask within the portion.

28. The method of claim 23, wherein the step of calculating a measure of confidence comprises:

obtaining the average value of the mask within the portion.

* * * * *

UNITED STATES PATENT AND TRADEMARK OFFICE
CERTIFICATE OF CORRECTION

PATENT NO.      : 6,456,297 B1
DATED           : September 24, 2002
INVENTOR(S)     : Gregg D. Wilensky It is certified that error appears in the above-identified patent and that said Letters Patent is hereby corrected as shown below:

<u>Column 11,</u>
Lines 48 and 54, please delete "bush" and replace it with -- brush --

Signed and Sealed this

Second Day of September, 2003

JAMES E. ROGAN
*Director of the United States Patent and Trademark Office*